United States Patent
Muraki

(10) Patent No.: US 6,425,583 B1
(45) Date of Patent: Jul. 30, 2002

(54) ROTARY RING AND MECHANICAL SEAL USING THE SAME

(75) Inventor: Ryoji Muraki, Gosen (JP)

(73) Assignees: Eagle Industry Company, Limited; Ebara Corporation, both of Tokyo (JP)

( * ) Notice: Subject to any disclaimer, the term of this patent is extended or adjusted under 35 U.S.C. 154(b) by 0 days.

(21) Appl. No.: 09/394,908

(22) Filed: Sep. 13, 1999

(30) Foreign Application Priority Data

Sep. 18, 1998 (JP) .......................................... 10-265078

(51) Int. Cl.⁷ ................................................ F16J 15/34
(52) U.S. Cl. ...................... 277/358; 277/359; 277/370; 277/399
(58) Field of Search ................................ 277/358, 370, 277/399, 359

(56) References Cited

U.S. PATENT DOCUMENTS

| | | | |
|---|---|---|---|
| 3,934,752 A | * | 1/1976 | Ravicchio et al. |
| 3,957,276 A | * | 5/1976 | Wiese |
| 4,065,136 A | * | 12/1977 | Miller, Jr. et al. |
| 4,212,475 A | * | 7/1980 | Sedy |
| 4,407,512 A | * | 10/1983 | Trytek |
| 4,416,458 A |   | 11/1983 | Takenaka et al. |
| 4,790,543 A | * | 12/1988 | Wittmeyer et al. |
| 5,135,235 A | * | 8/1992 | Parmar |
| 5,211,407 A | * | 5/1993 | Glynn et al. |
| 5,354,070 A | * | 10/1994 | Carmody |
| 5,468,002 A | * | 11/1995 | Wasser |
| 5,490,679 A | * | 2/1996 | Borrino et al. |
| 5,577,887 A | * | 11/1996 | Gouyon et al. |
| 5,681,047 A | * | 10/1997 | Klostermann et al. |

FOREIGN PATENT DOCUMENTS

| | | |
|---|---|---|
| EP | 0 470 409 A1 | 2/1992 |
| JP | 59-195251 | 12/1984 |
| JP | 4-10165 | 1/1992 |
| JP | 4-134963 | 12/1992 |
| JP | 6-17941 | 1/1994 |

* cited by examiner

Primary Examiner—Anthony Knight
Assistant Examiner—Vishal Patel
(74) Attorney, Agent, or Firm—Oliff & Berridge PLC

(57) ABSTRACT

A rotary ring has a seal end face located at an end of the axial line direction thereof perpendicularly to the axial line and an anti-seal end face located at the other end thereof in the axial line direction, wherein the seal end face and the seal end face of a fixed ring slide each other through a subject to be sealed. The cross-sectional shape of the rotary ring is made asymmetric with respect to right and left by forming a step around the outer peripheral portion thereof so that the center of gravity of the rotary ring is located at a position nearer to the anti-seal end face than the center of the plate thickness thereof. With this arrangement, the convex deformation made to the seal end face by the deformation of the rotary ring due to heat is canceled by the concave deformation made to the seal end face by a large amount of centrifugal force acting on the anti-seal end face. Accordingly, the rotary ring exhibits a stable sealing property.

6 Claims, 6 Drawing Sheets

RELATED ART

RELATED ART

ROTARY RING AND MECHANICAL SEAL USING THE SAME

BACKGROUND OF THE INVENTION

1. Field of the Invention

The present invention relates to a rotary ring and a mechanical seal using the same, and more particularly, to a rotary ring used for an end face type non-contact gas seal at high speed and a high speed end face type non-contact mechanical seal for gas using the same.

2. Description of the Related Art

Rotary rings used for end face type non-contact gas seals at high speed mainly comprise a hard ceramic material such as tungsten carbide, silicon carbide, silicon nitride and the like and are formed to a rectangular or substantially rectangular cross-sectional shape symmetrical with respect to right and left (refer to FIG. 8) to simplify machining and analysis.

Then, a rotary ring 31 arranged as described above is used as the rotary ring 31 of, for example, a high speed end face type non-contact mechanical seal for gas. When a rotary body (not shown) is rotated by mounting the mechanical seal on a part to be sealed, the rotary ring 31 is rotated together with the rotary body so that the seal end face 32 of the rotary ring 31 and the seal end face of a fixed ring (not shown) slide relative to each other through a subject to be sealed (inert gas, dangerous gas, air, steam, etc., hereinafter, the subject to be sealed is composed of any one of these materials), whereby the part to be sealed is sealed.

In this case, opening and closing forces, which act on both seal end faces, are balanced with each other by the cooperation of the pressure of the subject to be sealed and the urging force of an urging member (not shown) for pressing the rotary ring 31 or the fixed ring in the direction of the other of them, whereby the space between both seal end faces is kept to a space of several microns.

Since the rotary ring 31 arranged as described above is formed to a rectangular or substantially rectangular cross-sectional shape, symmetrical with respect to the right and left, the rotary ring 31 is mainly deformed in a radial direction by centrifugal force. The rotary ring therefore is not substantially deformed in an axial line direction. Therefore, it is sufficient to take deformation components due to pressure and due to heat into consideration as the deformation components of both the rings which affect the pressure distribution therebetween.

In this case, the deformation due to pressure can be optionally controlled by a buoyancy generating means 34 which is composed of dynamic pressure slits, static pressure slits, taper portions, stepped portions and the like formed at the seal end faces 32. However, the deformation due to heat can not be completely eliminated and it is difficult to reduce the deformation to a negligible level so long as a high speed seal is concerned.

While heat is generated from the respective surfaces of rotary components, it is generated in a highest density from the seal end face 32. As a result, a temperature gradient, which is high on the side of the seal end face 32 and low on the side of the anti-seal end face 33, is produced in the interior of the rotary ring 31. The temperature gradient thus causes the seal end face 32 to exhibit convex deformation by which the inner peripheral side thereof is swelled.

In many cases, the convex deformation increases the opening force generated between both the seal end faces, thereby increasing an amount of leakage of the subject to be sealed from between both seal end faces. On the contrary, however, there is also a case that the space near to the outer peripheral portion of the rotary ring 31 where the dynamic pressure slits exist is increased and a hydraulic pressure action is weakened. Thus a danger exists that the inner peripheral portion of the rotary ring 31 will come into contact with an opposite member.

In a dynamic pressure type non-contact seal, there is such a fundamental characteristic that a higher number of revolutions results in a higher dynamic pressure action so that the space between both the seal end faces is increased. However, when the affect of deformation due to heat is relatively increased on the dynamic pressure action, a problem arises in that the subject to be sealed is leaked in an excessive amount and the inner peripheral portion of one of the seal end faces comes into contact with the other of them.

The influence of the deformation due to heat is relatively increased in such a case that a slight amount of inclination of the rotary ring 31 causes the inner peripheral portion thereof to come into contact with the opposite member because the seal end face 32 has a large width, that is, because the size obtained by subtracting the inside diameter of the rotary ring 31 from the outside diameter thereof is large as well as a case that the deformation due to heat is made in a large amount due to the characteristic of a material.

An object of the present invention, which solves the problems of the conventional mechanical seal, is to provide a rotary ring and a mechanical seal using the rotary ring to reliably prevent a subject to be sealed from leaking excessively such that the inner peripheral portion of the rotary ring comes into contact with an opposite member even if the influence of deformation due to heat is relatively increased on a dynamic pressure action.

SUMMARY OF THE INVENTION

To solve the above problems, the present invention employs a rotary ring which is annular and has a center of gravity located at the center of a plate thickness comprising a seal end face located at an end of the rotary ring in the axial line direction thereof perpendicularly to the axial line, the seal end face sliding on the seal end face of a fixed ring through a subject to be sealed; and an anti-seal end face located at the other end of the rotary ring perpendicularly to the axial line, wherein the cross sectional shape of the rotary ring is formed such that the center of gravity is located at a position nearer to the anti-seal end face than the center of the plate thickness. The present invention employs such a cross sectional shape of the rotary ring made asymmetric with respect to the right and left by locating the center of gravity of the rotary ring at the position nearer to the anti-seal end face than the center of the plate thickness by forming a stepped portion, a recessed portion, an inclining portion and the like around the outer peripheral portion of the rotary ring. The present invention employs such a rotary ring comprising a material obtained by hardening at least a portion of a simple metal, a simple resin, a metal material, or a resin material by a means such as coating, plating, spraying, vapor deposition, nitriding and so forth. The present invention employs a mechanical seal comprising an annular rotary ring mounted on a rotary body so as to rotate integrally with the rotary body, having a seal end face located at an end of the rotary ring in the axial line direction thereof perpendicularly to the axial line, an anti-seal end face located at the other end of the rotary ring perpendicularly to the axial line and a center of gravity located at the center of a plate thickness; an annular fixed ring mounted on a fixed body, having a seal end face located at an end of the fixed ring in the axial line direction thereof perpendicularly to the axial line, the seal end face sliding on the seal end face of the rotary ring through a subject to be sealed; and an urging member for pressing the rotary ring or the fixed ring in the direction of the other thereof, wherein a predetermined space is kept between the seal end face of the rotary ring and the seal end face of the fixed ring by balancing closing forces with opening forces by the cooperation of the pressure of the subject to be sealed and the urging force of the urging member, and the cross-sectional shape of the rotary ring is formed such that the center of gravity thereof is located at a position nearer to the anti-seal end face than the center of the plate thickness. The present invention employs a cross sectional shape of the rotary ring made asymmetric with respect to the right and left by locating the center of gravity at the position nearer to the anti-seal end face than the center of the plate thickness by forming a stepped portion, a recessed portion, an inclining portion and the like around the outer peripheral portion of the rotary ring. Further, the present invention employs a rotary ring comprising a material obtained by hardening at least a portion of a simple metal, a simple resin, a metal material, or a resin material by a means such as coating, plating, spraying, vapor deposition, nitriding and so forth.

Since the present invention employs the above means, a large amount of centrifugal force can act on the anti-seal end face, and thus concave deformation can be made to the seal end face by the centrifugal force. Accordingly, the convex deformation made to the seal end face due to heat can be cancelled by the concave deformation.

DESCRIPTION OF THE PREFERRED EMBODIMENTS

Figure 1:
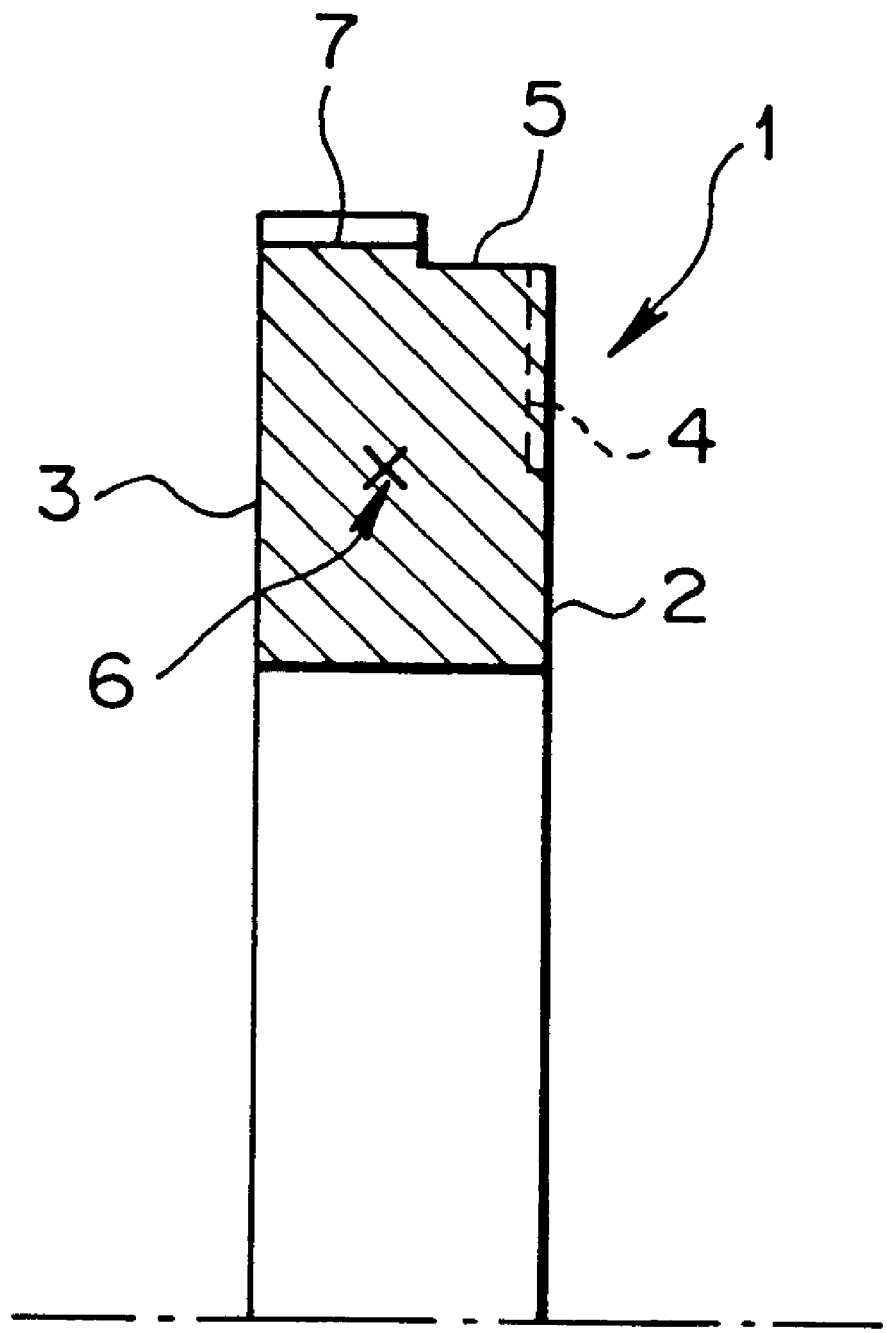
FIG. 1 is a sectional view showing an embodiment of a rotary ring according to the present invention.

Embodiments of the present invention shown in the drawings will be described below.

FIG. 1 shows an embodiment of a rotary ring according to the present invention. That is, the rotary ring 1 is formed to a ring shape from a hard ceramic material such as tungsten carbide, silicon carbide, silicon nitride, and has a seal end face 2 formed at an end thereof in an axial line direction perpendicularly to the axial line and an anti-seal end face 3 formed at the other thereof perpendicularly to the axial line.

A buoyancy generating means 4, which is composed of dynamic pressure slits, static pressure slits, taper portions, stepped portions and the like, is disposed to the seal end face 2 of the rotary ring 1 so as to keep a predetermined space between the seal end face 2 and the seal end face of a fixed ring (not shown).

The right half portion of the outer peripheral surface of the rotary ring 1 is cut out to a predetermined depth over the entire periphery thereof and an annular step 5 is formed thereto. The cross-sectional shape of the rotary ring 1 is made asymmetric with respect to right and left by the formation of the step 5 around the outer peripheral surface, whereby the position of the center of gravity of the rotary ring 1 is dislocated in the direction of the anti-seal end face 3 by a predetermined size from the center of the plate thickness of the rotary ring 1. Note that numeral 7 denotes a rotation preventing cutout which is disposed on the outer peripheral surface at at least one position.

Figure 2:
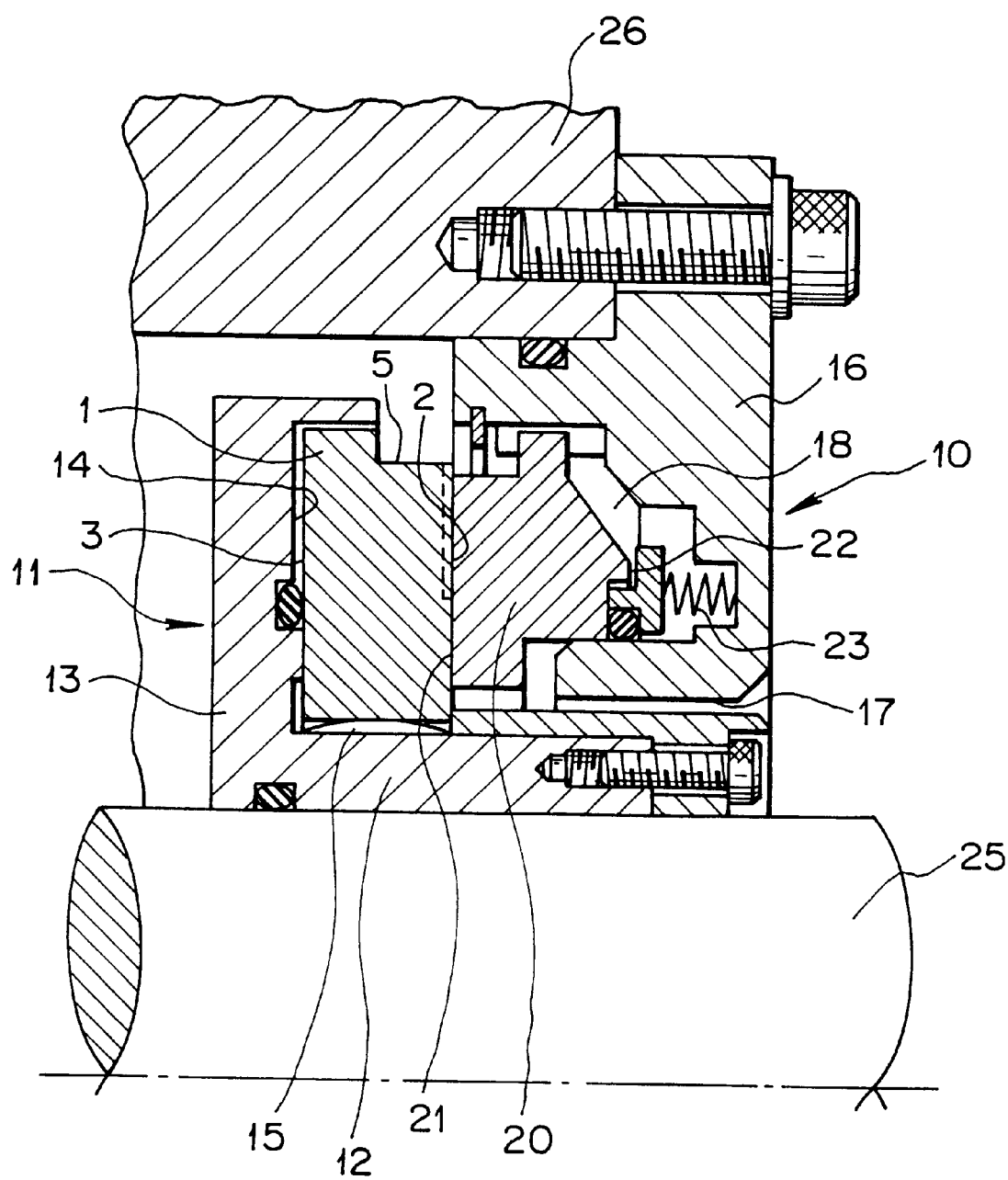
FIG. 2 is a sectional view showing an embodiment of a mechanical seal according to the present invention.

FIG. 2 shows an embodiment of a high pressure end face type non-contact mechanical seal 10 for gas. The mechanical seal 10 comprises a metal retainer 11 mounted on a rotary shaft 25 as a rotary body, the above rotary ring 1 mounted on the outer periphery of the metal retainer 11, a metal cover 16 mounted on a fixed body 26, a carbon fixed ring 20 mounted on the inner periphery of the cover 16, and compression springs 23 as an urging member mounted between the fixed ring 20 and the cover 16 for urging the fixed ring 20 in the direction of the rotary ring 1.

The retainer 11 comprises a cylindrical main body section 12 engaged with the rotary shaft 25 and a flange section 13 formed at an end of the main body section 12 in the axial line direction integrally therewith and swelling to the outside in a radial direction. An annular slot 14 is formed at an end face of the flange section 13 in the axial line direction to a predetermined depth, and the rotary ring 1 is mounted in the annular slot 14 through a centering plate spring 15.

A rotation preventing pin (not shown) is mounted between the rotation preventing cutout 7 of the rotary ring 1 and the retainer 11 and the relative rotation of the rotary ring 1 with respect to the retainer 11 can be prevented thereby.

The cover 16 is formed to a disc shape and a hole 17 is formed at the center thereof so that the rotary shaft 25 passes through the cover 16 in the axial line direction therethrough. In addition, an annular slot 18 having a predetermined depth is formed at an end face of the cover 16 in the axial line direction. The fixed ring 20, which will be described later, is mounted in the annular slot 18 so as to be movable in the axial line direction.

The fixed ring 20 is formed to an annular shape from carbon and has a seal end face 21 which is formed at an end thereof in the axial line direction perpendicularly to the axial line. Further, the fixed ring 20 has an anti-seal end face 22 formed at the other end thereof also perpendicularly to the axial line.

The compression springs 23 are mounted between the anti-seal end face 22 of the fixed ring 20 and the bottom of the slot 18 toward the peripheral direction of the fixed ring 20 at predetermined intervals so that the fixed ring 20 is urged in the direction of the rotary ring 1 by the urging forces of the compression springs 23.

When the mechanical seal 10 arranged as described above is mounted between the fixed body 26 and the rotary body 25 (rotary shaft 25) and the rotary shaft 25 is rotated, the retainer 11 and the rotary ring 1 are rotated together with the rotary shaft 25, whereby the seal end face 2 of the rotary ring 1 and the seal end face 21 of the fixed ring 20 slide each other through a subject to be sealed (inert gas, dangerous gas, air, steam, etc.) interposed therebetween. As a result, the space between the fixed body 26 and the rotary shaft 25 is sealed, that is, a section to be sealed is sealed.

In this case, since the rotary ring 1 is formed to the cross-sectional shape which is asymmetric with respect to right and left and the position of the center of gravity is located at the position dislocated to the anti-seal end face 3 side from the center of the plate thickness, a large amount of centrifugal force can act on the anti-seal end face 3 side. Concave deformation, by which the outer peripheral side of the seal end face 2 is swelled, can be made to the seal end face 2 by the centrifugal force, and thus the convex deformation, which is made to the seal end face 2 by heat, can be canceled by the concave deformation.

Therefore, even if the rotary ring 1 is deformed by heat, the film of the subject to be sealed can be stably formed between both the seal end faces 2 and 21 because the opening force can be balanced with the closing force therebetween. As a result, it can be avoided that an amount of leakage of the subject to be sealed is increased by the increase of the opening force. Further, such danger can be avoided that the inner peripheral portion of the seal end face 2 of the rotary ring 1 comes into contact with an opposite member because a dynamic pressure action is weakened by the increase of the space between the seal end faces 2 and 21 which is near to the outer peripheral portions thereof and where the buoyancy generating means 4 such as the dynamic pressure slits and the like exist.

While the convex deformation due to heat is cancelled by the concave deformation due to centrifugal force in the embodiment, it is also possible in principle to cancel the convex deformation due to heat by concave deformation due to pressure. However, in a seal in which the concave deformation due to pressure is promoted, opening force cannot be sufficiently obtained when it is at low speed or at rest and thus the seal may not act as a non-contact seal.

Heat in a seal end face is mainly generated when the viscosity of the subject to be sealed is sheared in minute intervals. According to a formula, torque is proportional to the number of revolution and generation of heat is proportional to the square of the number of revolution. In contrast, a rotary disc and a rotary cylinder are deformed by centrifugal force in proportion to the square of the number of revolution. As described above, since deformation due to heat and deformation due to centrifugal force increase at substantially the same ratio, deformation can be controlled so as to prevent an adverse affect caused by the deformation due to heat in a wide range of the number of revolution by positively making use of the deformation due to centrifugal force.

Figure 3:
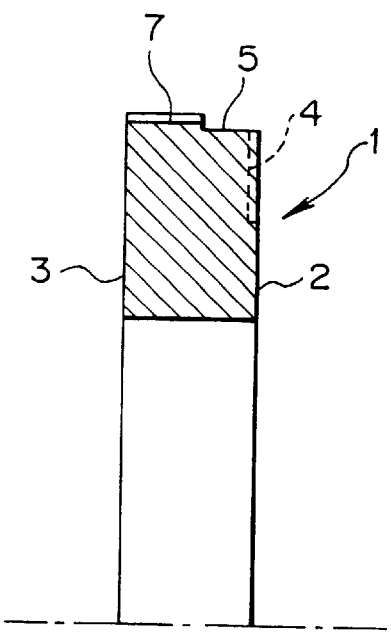
FIG. 3 is a sectional view showing another embodiment of the rotary ring.
Figure 4:
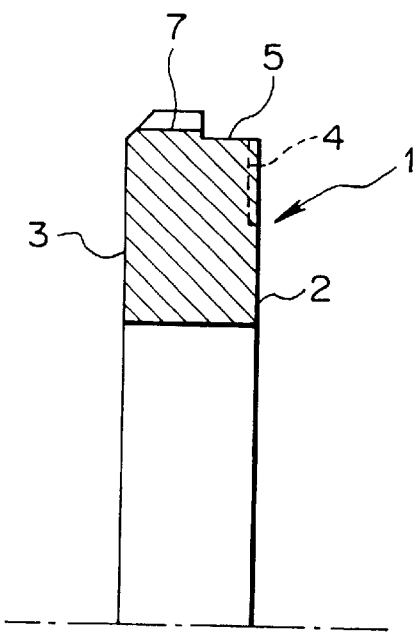
FIG. 4 is a sectional view showing still another embodiment of the rotary ring.
Figure 5:
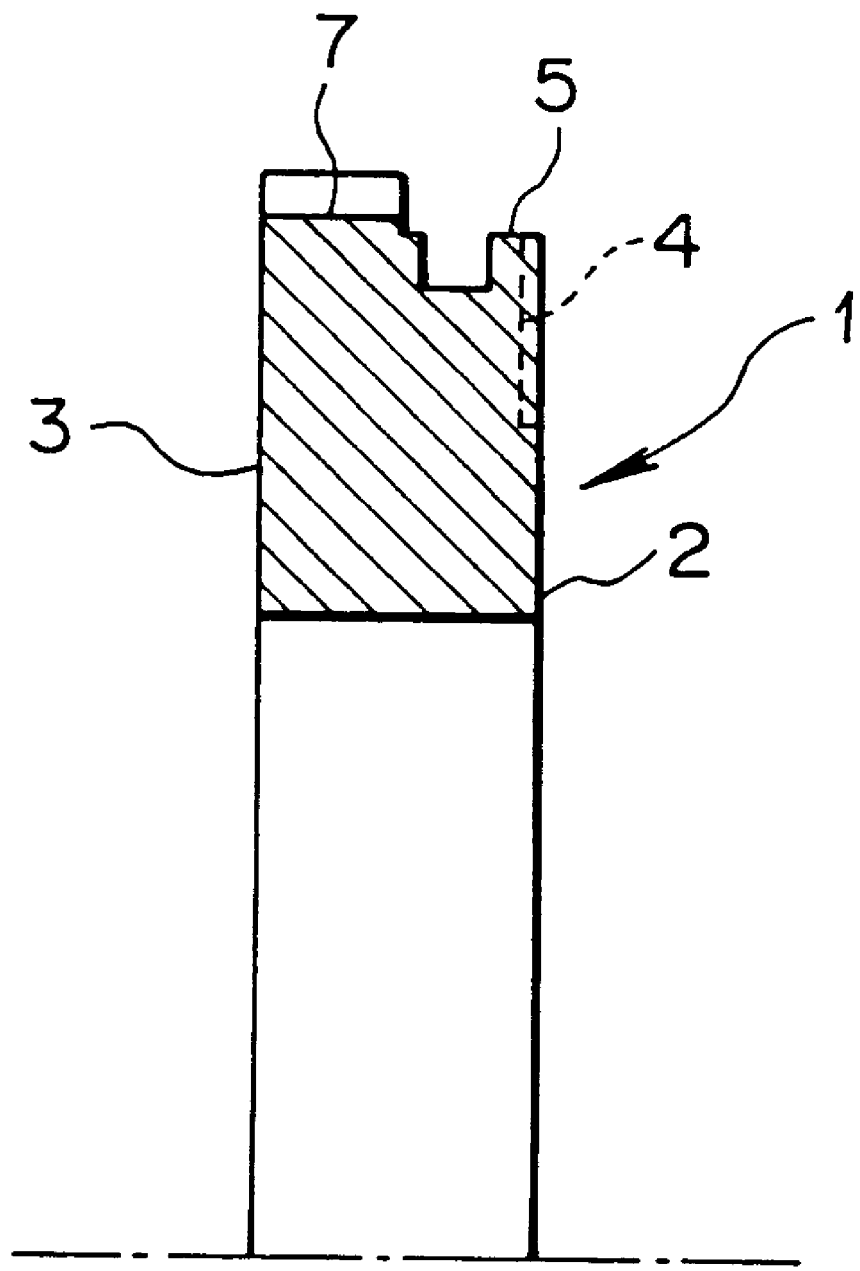
FIG. 5 is a sectional view showing a sectional view of a further embodiment of the rotary ring.

While deformation due to pressure, heat and centrifugal force can be calculated by the finite element method or the like, an amount of leakage may be different from an estimated amount depending upon actual products. When an amount of leakage is similar to an estimated amount at the time the seal is at rest, whereas when an amount of leakage is different from an estimated amount at the time the seal rotates, it is possible to adjust an amount of deformation due to centrifugal force by additionally machining the rotary ring 1. That is, the concave deformation due to centrifugal force can be reduced by, for example, reducing the depth of the step, as shown in FIG. 3, by additionally machining the outer peripheral surface of the rotary ring 1 from the state shown in FIG. 1 or by providing a chamfer around the outer peripheral portion of the anti-seal end face 3 as shown in FIG. 4. Further, as shown in FIG. 5, the concave deformation due to centrifugal force can be increased on the contrary by additionally machining a portion near to the seal end face 2.

As described above, an excessive amount of leakage of the subject to be sealed and the occurrence of damage arising from the contact of the seal end face with the opposite member can be prevented in a wide range of conditions under which the rotary ring is used by positively making use of the deformation of the rotary ring due to centrifugal force, from which a large effect can be expected to remove one of obstructions which arise when the end face type non-contact mechanical seal is increased in size and used at a higher speed under a larger pressure. While ceramic and carbon have been used as a seal ring in various types of mechanical seals including the non-contact seal, when such a brittle material is used as the rotary ring of a high speed seal, there is a possibility that the rotary ring is damaged by an unexpected accident and a rotary machine is secondarily broken thereby. While a trial is materialized to produce the rotary ring from a ductile material such as metal as a countermeasure against damage, one of the problems to be overcome to use the metal is a large amount of deformation due to heat of the metal. Since the thermal conductivity of metal is lower than that of ceramic and the coefficient of thermal expansion thereof is higher than that of ceramic in many cases, the convex deformation of metal due to heat is increased. According to the present invention, however, since the deformation due to heat can be canceled by the deformation due to centrifugal force, the present invention contributes to the actual use of a metal rotary ring. When there is no tribology characteristic, which is required to a seal end face, on a metal surface, the metal surface is subjected to a surface treatment such as coating and the like. However, the effect of the present invention is applied to surface-treated metal surface as it is.

Figure 6:
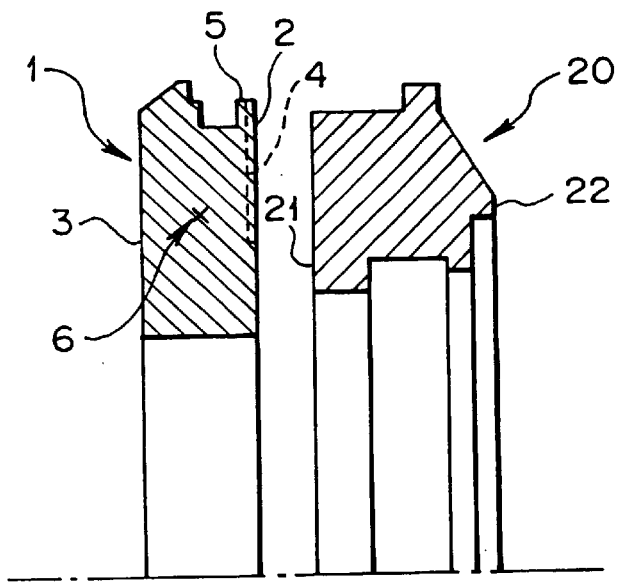
FIG. 6 is a sectional view showing how a rotary ring and a fixed ring were deformed in an embodiment of the mechanical seal according to the present invention.
Figure 7:
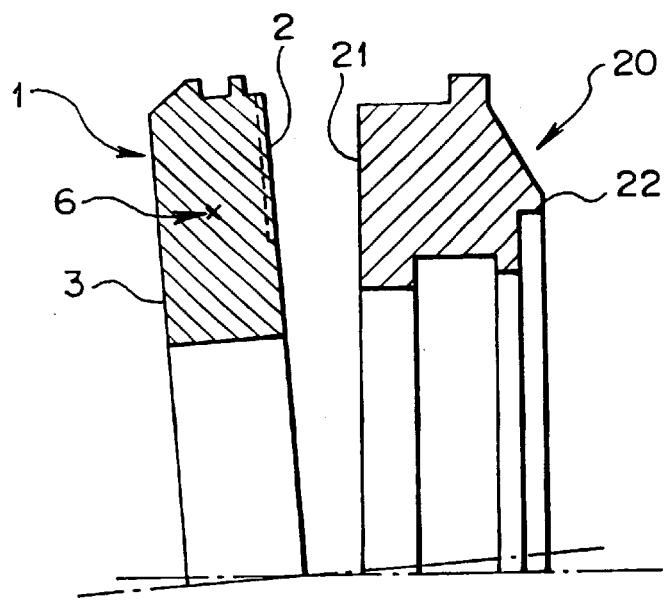
FIG. 7 is a sectional view showing how a rotary ring and a fixed ring were deformed in an embodiment of a conventional mechanical seal.
Figure 8:
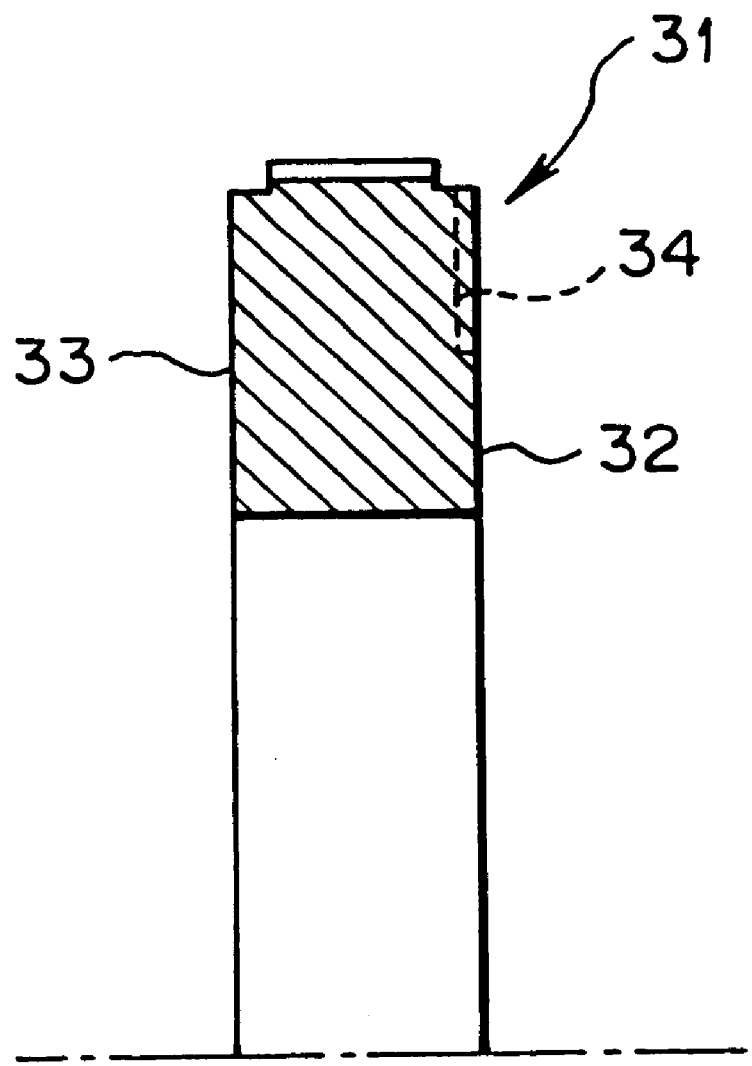
FIG. 8 is a sectional view showing an embodiment of a conventional rotary ring.

FIG. 6 shows how a rotary ring and a fixed ring were deformed in an embodiment of the mechanical seal according to the present invention, and FIG. 7 shows how a rotary ring and a fixed ring were deformed in an embodiment of a conventional mechanical seal. The states shown in these figures were obtained by calculating the deformed states of the rotary ring 1 and the fixed ring 20 of a non-contact mechanical seal for gas which is used in a shaft having a diameter of 76 mm.

A rotary ring 1 was made of martensite stainless steel and a ceramic film was formed only at a seal end face 1. A fixed ring 20 was made of carbon graphite. The rotary ring 1 had a thickness of 9 mm. The figure center of a cross section was located at a position 4.50 mm apart from the seal end face 2 in FIG. 7. When the seal shown in FIG. 7 was pressurized with a nitrogen gas to a gauge pressure of 3.43 MPa and rotated at 19500 rpm, the actually measured amount of leakage of the nitrogen gas was 89 Nl/min. Next, when the outer peripheral portion of the rotary ring 1 was additionally machined (FIG. 6), the figure center 6 of a cross section was moved to a position 4.59 mm apart from the seal end face 2 and it approached an anti-seal end face 3 from the center of the plate thickness of the rotary ring 1. A fixed ring 20 was used in FIG. 7. When the seal shown in FIG. 6 was pressurized with a nitrogen gas to a gauge pressure of 3.43 MPa and rotated at 19500 rpm, the actually measured amount of leakage of the nitrogen gas was 45 Nl/min. While an abnormal state such as the contact of the seal end face 2 and the like was not caused both before and after the additional machining, the amount of leakage was reduced to about one half the amount of leakage before the additional machining, that is, it was reduced from 89 Nl/min to 45 Nl/min. As described above, it can be found that the characteristics of the seal can be improved by intentionally dislocating the position of the figure center 6 of the cross section.

Since the present invention is arranged as described above, a large amount of centrifugal force can act on the anti-seal end face when the mechanical seal is rotated, so that concave deformation for swelling the outer peripheral portion of the seal end face can be made to the seal end face by the centrifugal force. Accordingly, even if convex deformation for swelling the inner periphery of the seal end face is made to the seal end face by deformation due to heat, it can be canceled by the concave deformation due to centrifugal force. As a result, the increase of the amount of the subject to be sealed, which is leaked from between the seal end faces can be prevented as well as the increase of danger that the inner peripheral portion of the seal end face comes into contact with the opposite member because the space between the seal end faces are increased, which is located near to the outer peripheries thereof. With this arrangement, a film composed of the subject to be sealed can be stably formed between the seal end faces and a part to be sealed can be stably sealed.

What is claimed is:

1. A mechanical seal comprising:
    a rotary shaft;
    a rotary ring having a plate shape and axis attached via a centering element to the rotary shaft so as to rotate together with the rotary shaft, the rotary ring having a seal end face at a first end of the rotary ring and an opposite end face at a second end of the rotary ring, wherein both of the seal end face and the opposite end face extend in a direction orthogonal to the axis of the rotary shaft;
    a buoyancy generating means formed on the seal end face of the rotary ring;
    a fixed body which the rotary shaft rotates relative to;
    a stationary ring axially movable and rotationally fixed to the fixed body and having a seal end face in a direction orthogonal to the axis of the rotary shaft at a first end of the stationary ring, wherein the seal end face of the rotary ring rotates relative to the seal end face of the stationary ring via a subject to be sealed therebetween so as to constitute a non-contact mechanical seal; and
    an energizing means for pressing the stationary ring toward the rotary ring along the axis of the rotary shaft, the rotary ring being made of a metal, the rotary ring having such a sectional shape that a location of a center of gravity of the rotary ring is set at a position dislocated from a center line of a plate thickness of the rotary ring in a direction of the axis toward the opposite end face of the rotary ring, wherein the rotary ring is not substantially deformed due to centrifugal force when it rotates at a first stage high speed, and the rotary ring is deformed mainly due to heat and centrifugal force at a second stage high speed and the deformation of the rotary ring due to heat is cancelled by the deformation of the rotary ring due to centrifugal force.

2. A mechanical seal as defined in claim 1, wherein convex deformation of the rotary ring occurs due to heat generated in the rotary ring and the subject to be sealed when the rotary ring rotates at the second stage high speed although the seal end face of the rotary ring and the seal end face of the stationary ring do not contact to each other so as to be in a non-contacting mechanical seal condition, and at the same time, concave deformation of the rotary ring occurs due to centrifugal force generated in the rotary ring, whereby convex deformation of the rotary ring due to heat is cancelled by concave deformation of the rotary ring due to centrifugal force when the rotary ring rotates at the second stage speed.

3. A mechanical seal as defined in claim 1, wherein the metal is a martensite stainless steel.

4. A mechanical seal as defined in claim 1, wherein the second stage high speed is about 19,500 rpm.

5. A mechanical seal as defined in claim 1, wherein the seal end face of the rotary ring has means for hardening the seal end face of the rotary ring.

6. A mechanical seal as defined in claim 1, wherein the hardening means is a coating.

* * * * *